(No Model.)  3 Sheets—Sheet 1.
F. H. KNIGHT.
TUBE EXPANDER.
No. 442,598. Patented Dec. 9, 1890.
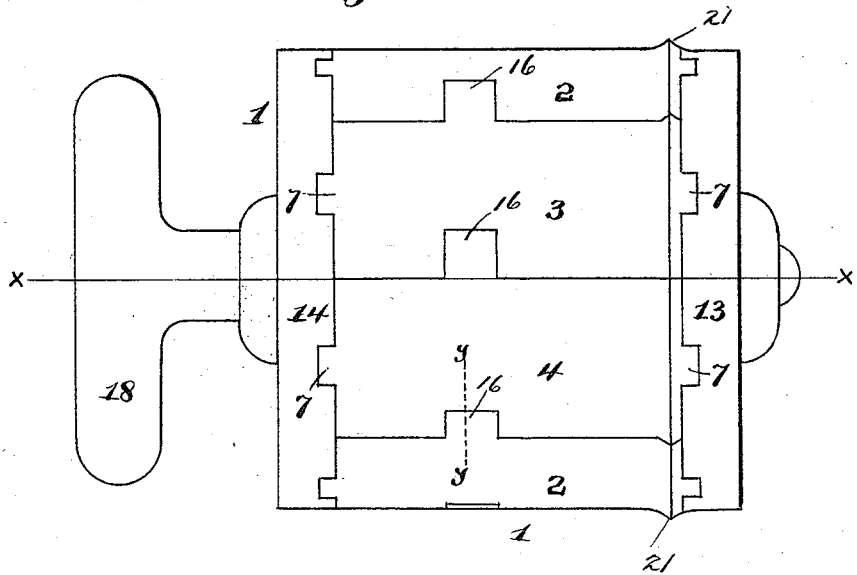
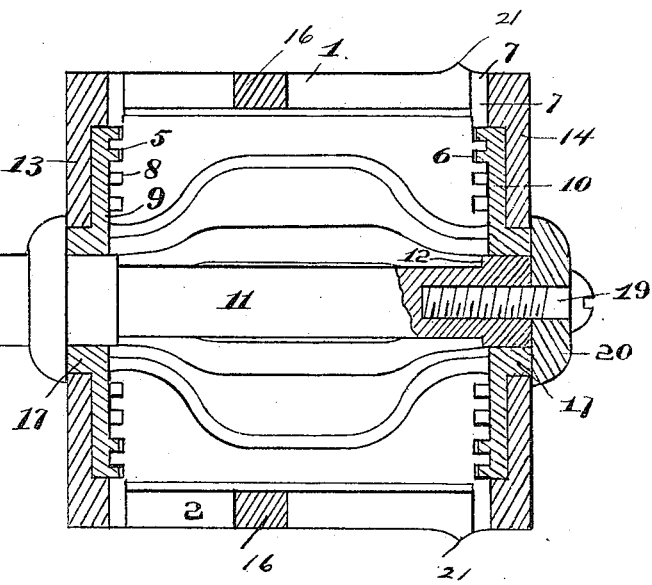
WITNESSES
J.B. McGirr.
Jos. Forrest
INVENTOR
Frank H. Knight
By W.E. Bernhard
Attorney (No Model.) 3 Sheets—Sheet 2.
F. H. KNIGHT.
TUBE EXPANDER.
No. 442,598. Patented Dec. 9, 1890.
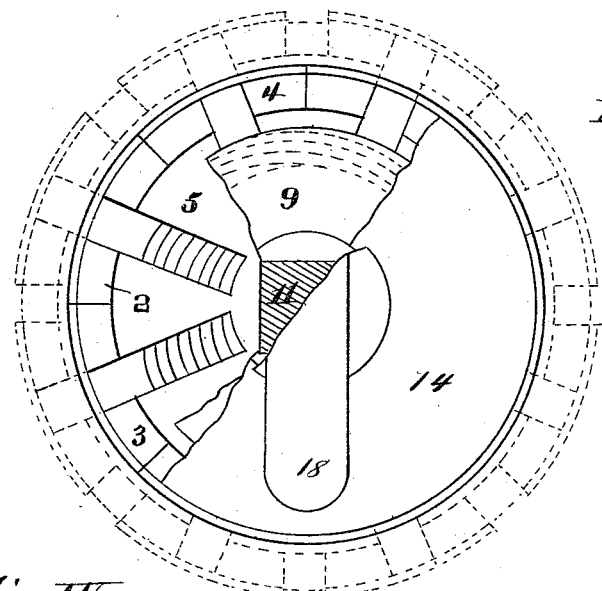
Fig. III.
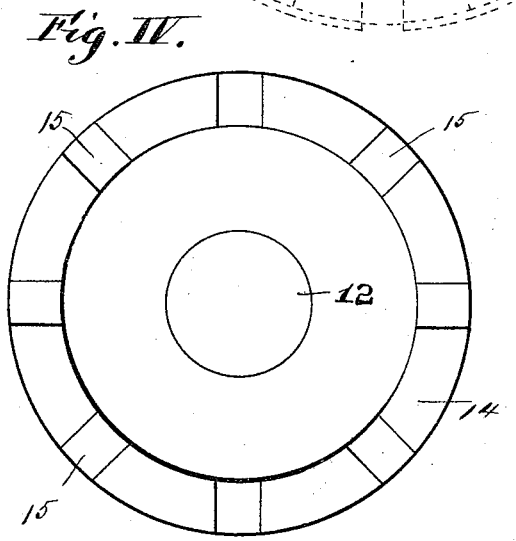
Fig. IV.
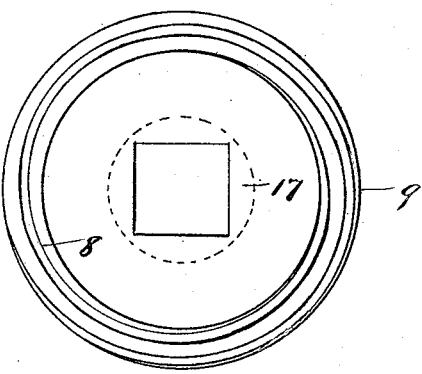
Fig. V.
WITNESSES
J. B. McGirr.
Jos. Forrest
INVENTOR
Frank H. Knight
By N. S. Bernhard
Attorney (No Model.) 3 Sheets—Sheet 3.
F. H. KNIGHT.
TUBE EXPANDER.
No. 442,598. Patented Dec. 9, 1890.
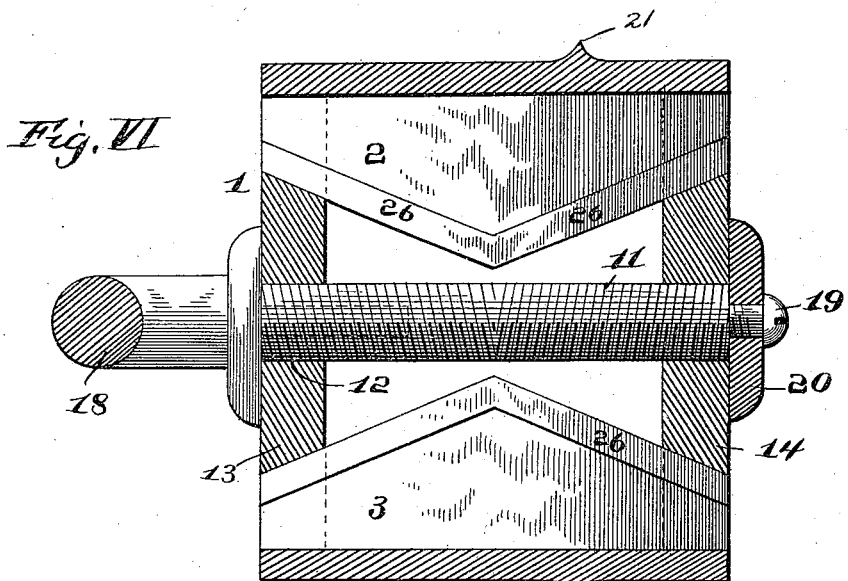
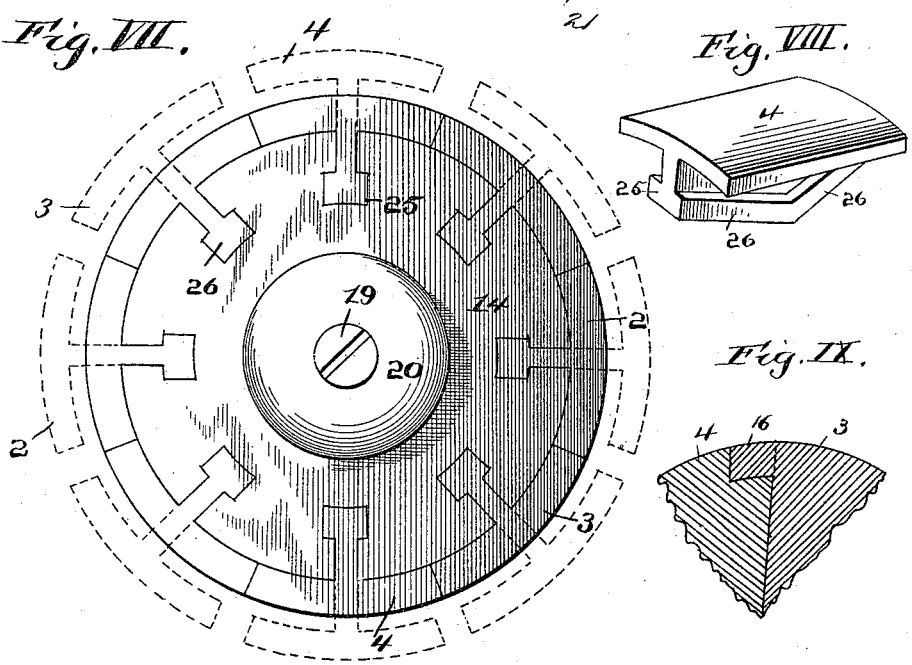
WITNESSES
H. B. McGinn.
Jos. Forrest
INVENTOR
Frank H. Knight
By W. H. Burnham
Attorney

UNITED STATES PATENT OFFICE.

FRANK H. KNIGHT, OF WASHINGTON, DISTRICT OF COLUMBIA.

TUBE-EXPANDER.

SPECIFICATION forming part of Letters Patent No. 442,598, dated December 9, 1890.

Application filed July 5, 1890. Serial No. 357,829. (No model.)

*To all whom it may concern:*

Be it known that I, FRANK H. KNIGHT, a citizen of the United States, residing at Washington, in the District of Columbia, have invented certain new and useful Improvements in Pipe or Tube Expanders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in tube-expanders, which is especially adapted for use by plumbers in expanding a pipe and calking up the joint between two pieces of pipe; but the device is also capable of use in expanding boiler-tubes and to other uses.

Heretofore it has been the common practice of plumbers to employ a thimble in the pipes to afford a bearing-surface while calking up the joint; but it is a difficult and tedious operation to remove this thimble from the pipes after the joint has been calked.

The object of my present invention is to dispense with the use of the thimble by providing a device which is adapted to expand the pipe to afford a bearing-surface while calking up the joint, and which can be easily and readily removed from the pipe after the joint has been tightly calked.

A further object is to provide a portable and compact tube-expander capable of exerting great force or pressure internally of the pipe to force or expand the same radially and which shall at the same time be simple and durable in construction and cheap of manufacture.

With these and other ends in view my invention consists of an annular body divided on longitudinal lines into a plurality or series of sections, the external surface of the body being cylindrical and practically continuous when the sections are expanded radially, a shaft or arbor extending through the body, and disks carried by or mounted on said shaft within the body, and which are connected to or arranged to act upon the sections of said body, so as to adjust said sections radially. As the shaft or arbor is turned in one direction, the disks are moved, and they operate on the sections of the body to move them outwardly and expand the body, and a reverse motion of the shaft or arbor withdraws the sections, so as to contract the body, as will be readily understood.

My invention further consists in the combinations of devices and novel construction and arrangement of parts, as will be hereinafter fully described and claimed.

To enable others to more readily understand my invention, I have illustrated the same in the accompanying drawings, in which—

Figure I is an elevation of a tube or pipe expander constructed in accordance with my invention. Fig. II is a longitudinal central sectional view of the same. Fig. III is an end view with one of the guide disks or heads partly broken away. Fig. IV is a face view of one of the stationary guide-disks. Fig. V is a face view of one of the rotatory disks, showing the worm screw-thread thereon. Fig. VI is a longitudinal sectional view through another form of tube-expander embodying my invention. Fig. VII is an end elevation of the expander shown in Fig. VI, showing the sections of the body in their expanded positions by dotted lines. Fig. VIII is a detail view of one of the sections of the body. Fig. IX is a detail sectional view on the line $y\ y$ of Fig. I.

Like numerals of reference denote corresponding parts in all the figures of the drawings, referring to which—

1 designates the annular body of my improved pipe or tube expander, which is divided on radial and longitudinal lines to form a plurality of sections or members 2 3 4, which are substantially the same in construction and form. These longitudinal sections are constructed or shaped to fit snugly together when the body is contracted, and thus present the continuous cylindrical surface, and said sections are adapted to be adjusted on lines radiating from the longitudinal axis of the body, in order to expand or contract said body.

In the end faces of the body are formed annular recesses or spaces 5 6, which are of less diameter than the diameter of the body and are concentric with the external surface of said annular body, and each individual member or section of the body is provided with lugs 7 7 at the ends thereof, which lugs extend outward in line with the section, and which are adapted to be fitted in suitable radial guides, presently referred to. In the ends of the body, within the recesses 5 6 therein, are cut the worm screw-threads 8, which are spiral in form, and in said recesses are arranged or fitted the disks 9 10, which operate to expand and contract the sections of the body.

In one embodiment of my invention I adapt the disks for rotation with a central longitudinal shaft, and in the inner faces of said disks adjacent to the spiral worm screw-threads 8, I cut similar spiral worm-threads which engage with the spiral threads in the ends of the body, the threads on one of said disks being "right-hand" threads and engaging corresponding threads on one end of the body, while the threads on the other end of the body and the other rotatory disk are left-handed, in order to adapt both of said rotatory threaded disks to act together in adjusting the sections or members in the same direction. These rotatory threaded disks are keyed to or fitted on squared portions of a single shaft or arbor 11, that extends longitudinally through a central passage 12 in the body 1. The rotatory disks are arranged in the recesses of the body and within the stationary guide-heads 13 14, the diameter of the heads being substantially the same as the diameter of the body when it is contracted; and these heads remain stationary and serve as guides to the sections or members in their radial adjustments, each section or member being connected at its ends to the heads by a radial slide-joint, which is preferably secured by making radial grooves 15 in the inner faces of the heads and fitting therein the lugs 7 on the ends of the sections or members. The members are thus held in position at their ends by the guide-heads, and they are connected to each other at points intermediate of their length by similar slide-joints 16, formed by the grooves in each section, receiving the protruding tongues on the adjoining sections.

The rotatory disks, which are keyed to or rigid with the longitudinal shaft or arbor, are each provided with a protruding annular sleeve or boss 17, which fits snugly in a corresponding aperture in one of the guide-heads, so that the rotatory disks are free to turn in the stationary guide-heads with the shaft or arbor. One end of the arbor or shaft is provided with a suitable handle 18, and the other end has an interiorily-threaded hole that receives a screw 19, which holds the washer 20 in place, which washer bears against the head or disk adjacent thereto. The axially-turning shaft thus serves to hold the guide-heads in proper relation to each other, while at the same time said shaft and the rotatory disks are free to turn within the heads, and the stationary guide-heads serve to hold the sections of the body in place and to guide said sections in their radial adjustments, the sections being prevented from dropping out of the disks by reason of the screw-threaded connection between the sections and the disks on the shaft or arbor.

The operation of my invention is obvious, and may be briefly described as follows: To expand the pipe to receive another pipe, the implement is inserted into the end of the pipe and the shaft or arbor turned axially by means of the handle to rotate the right and left hand threaded disks, which in turn operate together on the sections of the body to force them outward on radial lines, and thus uniformly expand the body and the pipe in which the body is fitted. The pipe and joint having been expanded, the joint is now calked tightly in the usual manner, and as the sections of the body form practically a continuous bearing-surface the joint can be calked to the same advantage as when a thimble is inserted in the joint. After the operation of calking the joint has been completed the shaft or arbor is turned axially to draw the sections inward and contract the body, and the implement can now be easily withdrawn from the pipe.

When the implement is designed for use in expanding boiler-tubes, I provide each section of the body with a lip, flange, or projection 21 on its external surface, and the projections on the series of sections are arranged in line substantially around the body, near one end thereof. These projections are continuous when the body is contracted, and they flare outwardly from the body and slightly increase the diameter of the body at or near one end thereof, whereby the implement is is adapted to expand the ends of a boiler-tube and bend or flare the same outwardly to secure it in the head of the boiler more firmly. This construction of the implement (i. e., with the annular flange or lip) is, however, optional, and may be omitted, although I prefer the same when the implement is to be used in expanding boiler-tubes.

I do not confine myself to the precise means herein shown and described for radially adjusting the sections or members of the implement from a common single shaft or arbor, as I may employ the modified devices shown in Figs. X and XI for this purpose.

In lieu of forming screw-threads on the ends of the body-sections and faces of the rotatory disks and adapting the disks to rotate with the shaft or arbor, I contemplate the following construction for expanding and contracting the sectional body: The shaft is formed with a right-hand screw-thread near one end and a left-hand screw-thread near the opposite end, and on these threaded portions are fitted the two disks, which have correspondingly-threaded openings, so that as the shaft is turned axially said disks are moved back and forth on the shaft longitudinally thereof instead of rotating with the same. The disks are provided in their peripheries with transverse recesses 25, which lie at an angle or obliquely to the axis of the disks, and in these recesses are fitted ribs 26 on the inner edges of the sections of the body, and the ribs in the device shown in Figs. IX and X are substantially the same as those heretofore described, with the exception of the ribs 26 on the minor edge of each section. The rib 26 at one end of the body-section is inclined from one end toward the middle, and the rib 26 at the other end of said body-section is reversely inclined, said ribs meeting at the middle of the section.

The sliding disks are moved in opposite directions simultaneously by the axial turning of the shaft, and as the oppositely-inclined ribs 26 on the body-sections impinge against the faces of the inclined transverse recesses 25 in said disks the sections of the body are forced radially in the same manner as the device heretofore described.

In order to connect the sections of the body to the disks, I make the ribs 26 T-shaped in cross-section and fit the same in correspondingly-shaped recesses in the actuating-disks on the longitudinal shaft or arbor.

I am aware that changes in the form and proportion of parts and details of construction can be made without departing from the spirit or sacrificing the advantages of my invention, and I therefore reserve the right to make such alterations and modifications as fall within the scope of my invention.

Having thus fully described my invention, what I claim as new, and desire to secure by Letters Patent, is—

1. In a pipe or tube expander, a cylindrical body divided longitudinally into a plurality of sections, the surface of which sectional body is substantially continuous when the sections are expanded and contracted, in combination with a shaft and disks carried by the shaft and connected to the sections of the body, substantially in the manner specified, and operating to expand or contract said sections and to retain the same in their proper relative positions, as set forth.

2. In a pipe or tube expander, the annular body divided on longitudinal and radial lines into a plurality of sections which are guided by suitable radial guides, in combination with the shaft extending through the body and the disks arranged within the body and actuated by the shaft to adjust the sections of the body radially, substantially as described.

3. In a pipe or tube expander, the annular body divided on longitudinal lines into sections, the segmental faces of which sections form substantially a continuous annular surface, in combination with a longitudinal axially-turning shaft extending through the body, and the movable disks connected to all the sections of the body near the ends thereof and actuated by the shaft to move the sections radially, substantially as described.

4. In a pipe or tube expander, the annular body divided on longitudinal lines into sections, the segmental faces of which present substantially a continuous annular surface, and each section provided with a flared or inclined lip at or near one end, in combination with a longitudinal axially-turning shaft and disks connected to the sections of the body and actuated by said shaft for adjusting the sections of the body radially, substantially as described.

5. In a pipe or tube expander, the combination of an annular sectional body, a longitudinal axially-turning shaft extending through said body, and the movable disks connected to all the sections of the body and actuated by axial rotation of said shaft to adjust the sections radially, substantially as described.

6. In a pipe or tube expander, the combination of the stationary guide-heads, the annular body divided into longitudinal sections, said sections being connected to each other and to the heads by slide-joints, the longitudinal axially-turning shaft, and the movable disks carried by the shaft and connected by slide-joints to the sections of the body to simultaneously adjust the same, substantially as described.

7. In a pipe or tube expander, the combination of the stationary guide-heads, the longitudinal axially-turning shaft extending loosely through said guide-heads, the annular body divided on radial and longitudinal lines into sections which are fitted in ways on the guide-heads, and the movable disks fitted on the shaft and connected by slide-joints with the sections of the body, substantially as described.

8. In a pipe or tube expander, the annular body divided on longitudinal lines into sections, which sections are connected to each other by slide-joints, and the segmental faces of which sections form substantially a continuous annular surface, in combination with an axially-turning shaft extending through said body, and the movable disks carried by the shaft and connected to the sections of the body, substantially as described.

In testimony whereof I affix my signature in presence of two witnesses.

FRANK H. KNIGHT.

Witnesses:
 JOS. FORREST,
 H. I. BERNHARD.